US009760284B2

(12) United States Patent
Bender et al.

(10) Patent No.: US 9,760,284 B2
(45) Date of Patent: Sep. 12, 2017

(54) PRESERVING VIRTUAL PRODUCT DATA IN A COMPUTER SYSTEM

(71) Applicant: INTERNATIONAL BUSINESS MACHINES CORPORATION, Armonk, NY (US)

(72) Inventors: Carl A. Bender, Highland, NY (US); An Ding Chen, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 66 days.

(21) Appl. No.: 14/918,046

(22) Filed: Oct. 20, 2015

(65) Prior Publication Data

US 2017/0109046 A1    Apr. 20, 2017

(51) Int. Cl.
*G06F 12/00* (2006.01)
*G06F 3/06* (2006.01)

(52) U.S. Cl.
CPC ............ *G06F 3/0604* (2013.01); *G06F 3/065* (2013.01); *G06F 3/0664* (2013.01); *G06F 3/0673* (2013.01)

(58) Field of Classification Search
None
See application file for complete search history.

(56) References Cited

U.S. PATENT DOCUMENTS

| 6,289,405 | B1  | 9/2001  | Movall et al. |
| 6,625,703 | B2  | 9/2003  | Goodman et al. |
| 6,922,709 | B2* | 7/2005  | Goodman ......... G06F 17/30371 707/695 |
| 6,934,879 | B2  | 8/2005  | Misra et al. |
| 7,444,360 | B2  | 10/2008 | Frondozo et al. |
| 8,447,921 | B2  | 5/2013  | Boecker et al. |
| 2004/0215569 | A1 | 10/2004 | Agha et al. |
| 2012/0185724 | A1 | 7/2012  | Boecker et al. |
| 2012/0272096 | A1 | 10/2012 | Batwara et al. |

OTHER PUBLICATIONS

Peter Mell et al., "The NIST Definition of Cloud Computing", National Institute of Standards and Technology, U.S. Department of Commerce, NIST Special Publication 800-145, Sep. 2011, 7 pages.

* cited by examiner

*Primary Examiner* — Baboucarr Faal
(74) *Attorney, Agent, or Firm* — Heslin Rothenberg Farley & Mesiti P.C.

(57) ABSTRACT

A method, computer program product, and system maintain virtual product data (VPD) in a computer system. The method includes a processor obtaining a first indicator, which may indicate a repair has commenced in a computer system or an initial program load has commenced in the computer system, accessing VPD related to the computer system, and duplicating the VPD to create a copy of the VPD. The processor stores the copy of the VPD in at least one computing element internal to the processor or accessible to the processor via a communications network. The processor obtains a second indicator that indicates that the initial program load is complete or that the repair process is complete, compares the VPD to the copy of the VPD, and determines whether to replace at least a portion of the VPD with at least a portion of the copy of the VPD.

17 Claims, 8 Drawing Sheets

PRESERVING VIRTUAL PRODUCT DATA IN A COMPUTER SYSTEM

BACKGROUND

One or more aspects relate, in general, to preserving the Virtual Product Data (VPD), a collection of configuration and informational data associated with a particular set of hardware or software, when certain changes are made to the system that could impact the VPD.

Preserving the VPD associated with a given system (hardware and/or software) is desirable because VPD may store information relating to the system, including but not limited to, product model number, part numbers, serial numbers, and engineering change levels and the collection and use of VPD allows the status of a network or computer system to be understood and service provided more quickly. VPD can be burned into Electrically Erasable Programmable Read-Only Memories (EEPROMs) associated with various hardware components and can be queried through attached Inter-Integrated Circuit (I2C) buses. It is used by firmware to determine the nature of the system hardware, and to shield the operation of the firmware from minor changes and variations of hardware implementations within a given machine model number, and provide control of enablement features When hardware or software is serviced in the field, VPD can be lost and a Support Services Representative (SSR) may have to rewrite the VPD by command. Loss of VPD can occur due to, but not limited to, improper writing, replacing parts that contain the VPD, and/or because a procedure to restore VPD was not followed.

SUMMARY

Shortcomings of the prior art are overcome and additional advantages are provided through the provision of a computer program product for maintaining virtual product data (VPD) in a computer system. The computer program product comprises a storage medium readable by a processing circuit and storing instructions for execution by the processing circuit for performing a method. The method includes, for instance, obtaining, by a processor, a first indicator, wherein the first indicator indicates one of: a repair has commenced in a computer system or an initial program load has commenced in the computer system; based on the obtaining of the first indicator, accessing, by a processor, VPD related to the computer system and duplicating the VPD to create a copy of the VPD; storing, by the processor, the copy of the VPD in at least one computing element internal to the processor or accessible to the processor via a communications network; obtaining, by the processor, a second indicator, wherein the second indicator indicates one of: that the initial program load is complete or that the repair process is complete; based on the obtaining of the second indicator, comparing, by the processor, the VPD to the copy of the VPD; and determining, by the processor, whether to replace at least a portion of the VPD with at least a portion of the copy of the VPD.

Methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
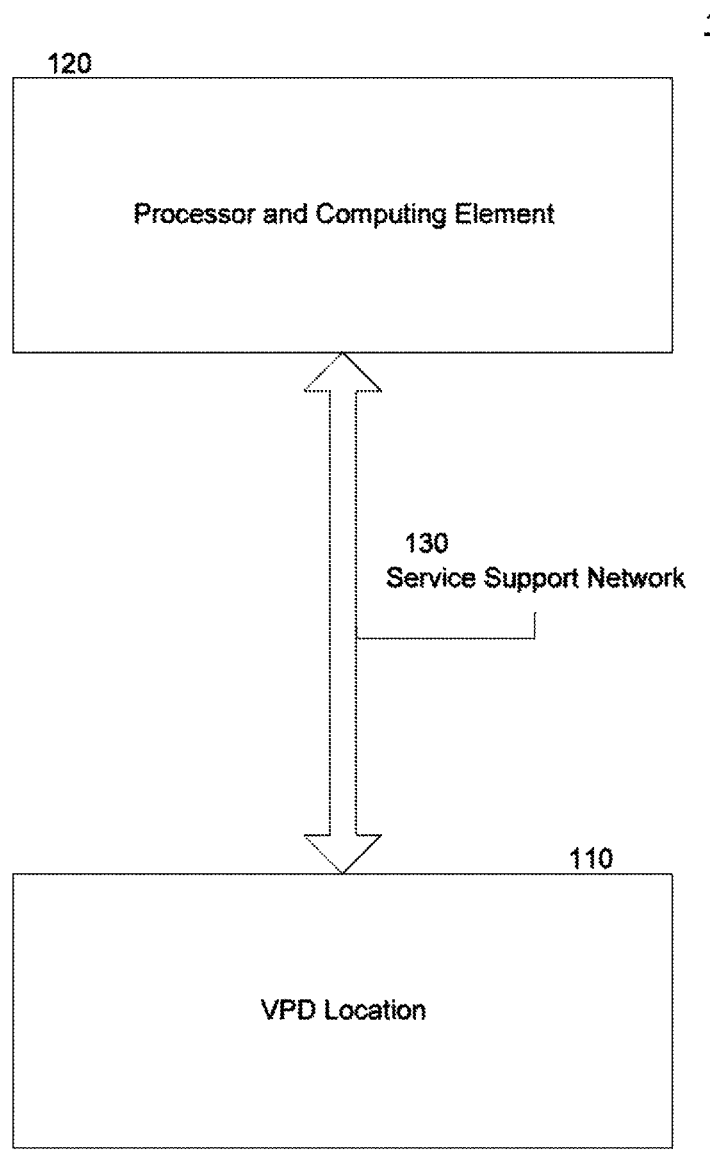
FIG. 1 depicts interactions between certain elements in a technical environment that may be utilized by an embodiment of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 6:
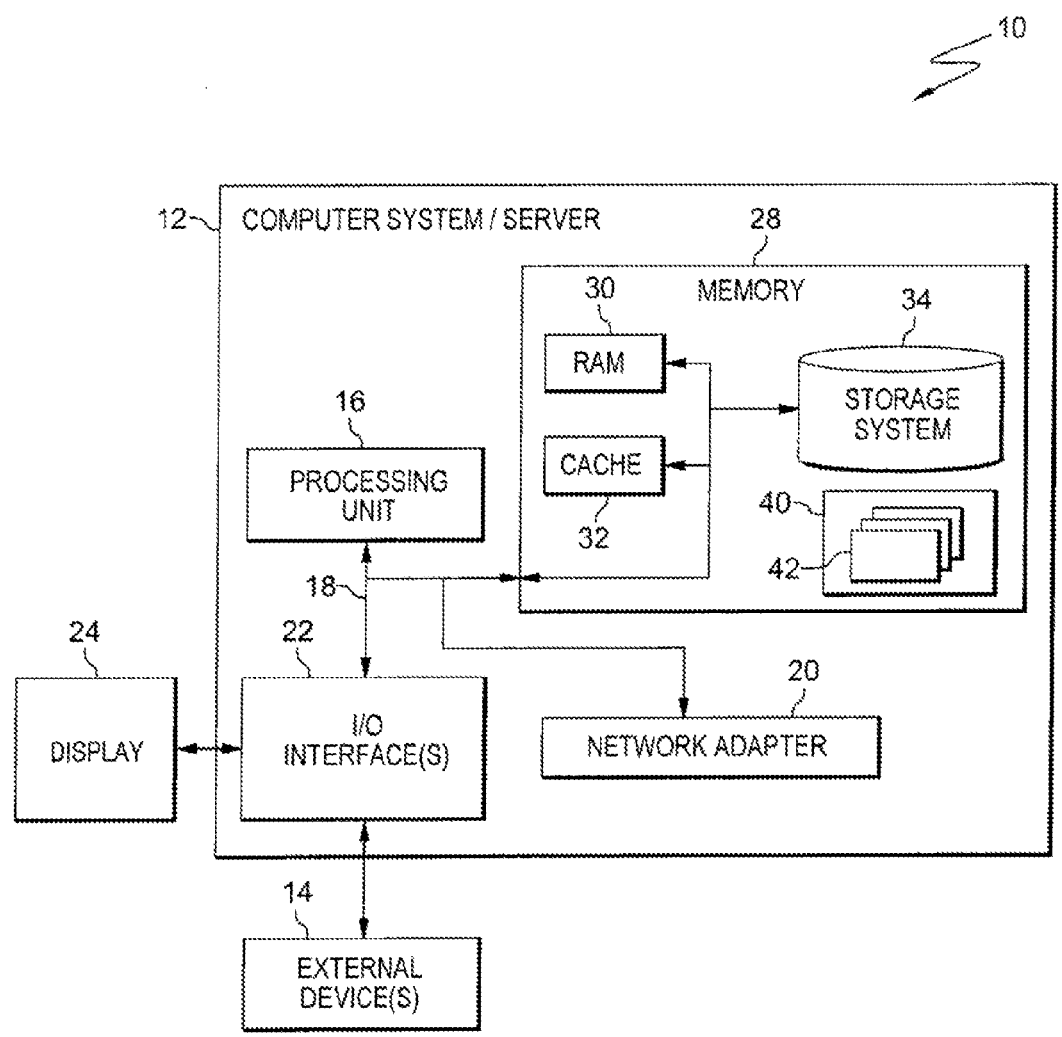
FIG. 6 depicts one embodiment of a cloud computing node.

In accordance with one or more aspects, an embodiment of the present invention provides a method of verifying enclosure Virtual Product Data (VPD) in order to avoid VPD loss, for example, when network and system elements, including but not limited to a cloud computing node, such as the node depicted in FIG. 6, are serviced in the field. Preserving the VPD is desirable because when VPD are complete and correct, they may be used by firmware to determine the nature of the system hardware and to shield the operation of the firmware from minor changes and variations of hardware implementations within a given machine model number, and provide control of enablement features like Capacity on Demand (COD). For example, in IBM® systems, the VPD contains information including Machine Type, Model and Serial number (MTMS), System Brand, System Unique ID (SUID), and Capacity on Demand Activation codes (COD).

In certain aspects of an embodiment of the present invention, when program code executed by a processor obtains an indication that a repair has commenced in a computer system or an initial program load has commenced in the computer system, the program code accesses the VPD and duplicates the VPD to create a copy of the VPD. If the indication relates to a repair, this repair may include, but is not limited to replacement of at least one part related to a computer resource that stores VPD. In certain embodiments of the present invention, the program code may have previously obtained an inventory of parts and populated the VPD and/or created the copy of the VPD based on the data gathered during the inventory. Upon creating the copy of the VPD, the program code then stores the copy of the VPD in at least one computing element internal to the processor or accessible to the processor via a communications network. The program code obtains an indication that the aforementioned repair is complete or that the initial program load is complete and based on obtaining that indication, the program code compares the VPD to the copy of the VPD and determines whether to replace at least a portion of the VPD with at least a portion of the copy of the VPD. Based on the results of the comparison, the program code may replace the at least a portion of the VPD with the at least a portion of the copy of the VPD.

In an embodiment of the present invention, at least one of the communications network, the processor, and the computing element that is utilized by the program code executed by the processor to store the copy of the VPD are all existing elements of the computer system, meaning that no additional dedicated computing or network elements are added to the computer system in order to execute the described method. Rather, the functionality described is accomplished by elements that are already serving roles within the system. For example, the processor may be a service processor or another service element coupled to an element of the computer system storing the VPD. Thus, embodiments of the present invention may provide an advantage of limiting additional overhead.

In certain embodiments of the present invention, the VPD may be stored in an expansion unit and that expansion unit may be an Input/Output (I/O) drawer. Utilizing a general expansion unit or specifically, an I/O drawer to store VPD are offered as non-limiting examples to further illustrate aspects of some embodiments of the present invention.

In certain embodiments of the present invention, the program code may access the VPD to create a second a second copy of the VPD. The program code stores the second copy of the VPD on a VPD card that is accessible to the processor via a network. When the program code changes at least a portion of the VPD, for example, by replacing at least some of the VPD with data from the initial copy of the VPD, the program code may also compare the now-changed VPD with the second copy of the VPD and update the second copy of the VPD to be consistent with the VPD.

As aforementioned, the processor that executed the program code in embodiments of the present invention may be a processor that is not dedicated to performing aspects of the present invention, but, rather, is utilized within the computer system primarily for a different task. Thus, the processor may be a service processor. The processor may also be redundant. An examples of processor that may be utilized in certain embodiments of the present invention include, but are not limited to, a flexible service processor or a bulk power controller.

In an aspect of certain embodiments of the present invention, when a system is first initialized, program code copies VPD information which can be stored in a variety of places on a computer system or accessible to elements of a computer system, including but not limited to an expansion unit on a server, such as an I/O drawer, to at least one additional location. As aforementioned, this initialization, including the copying, may also be a result of the program code obtaining an indication that a repair process had started. This additional location is selected to store a copy of the VPD because this location will not be changed or repaired at the same time as the initial storage location. For example, the VPD can be copied to a processor, including but not limited to a service processor, and/or to a VPD card. Thus, when a part is replaced and the VPD at the initial location is compromised, the VPD data in the additional location can be relied on to correct any discrepancies in at the initial location. The communications between the initial location and the backup location can be handled by existing elements of the network and at least one additional location can be an existing element of the environment, rather than a new, dedicated, resource.

One approach to preventing VPD at the initial location from being compromised is keeping multiple copies of the VPD at this location and utilizing a voting mechanism whereby when parts of the location are replaced, the multiple copies coordinate with each other to reach an agreement about what the VPD should be based on the coordination of values between these multiple copies. Unfortunately, this process is compromised when multiple parts are replace at once, creating either an incomplete or a misleading picture of what the VPD should be. Aspects of certain embodiments of the present invention present an advantage over this method because the additional location where the program code stores a copy of the VPD is not affected by the parts replacement that can compromise the data at the initial location, regardless of how many copies are stored there.

An advantage of certain embodiments of the present invention is that they may improve service quality and, therefore product image for customers as aspects of the disclosed method can be cost effective because rather than adding new hardware, embodiments of the present technique instead, utilize an existing firmware/software technology. For example, some embodiments of the present invention utilize elements of an existing network and computing resources, which may be referred to as a service support network, rather than requiring any specialized additional hardware or software, including but not limited to a special/dedicated communication module.

Embodiments of the present invention may further improve VPD preservation during service procedures by automating certain manual steps in the service of various components. The manual steps can introduce inefficiencies, such as human error.

Another advantage of certain embodiments of the present invention is that they utilize a VPD card to synchronize the information and also provide an additional way to verify that the VPD is complete and correct.

FIG. 1 depicts interactions between certain elements in a technical environment 100 that may be utilized by an embodiment of the present invention. In an embodiment of the present technique, the VPD associated with software and/or hardware is stored at one or more locations, represented in FIG. 1 as a VPD location 110. As aforementioned, in certain embodiments of the present invention, a VPD location may comprise an expansion unit on a server, including but not limited to an I/O drawer. Certain parts in the VPD location 110 are used to store VPD associated with the location, but these parts may need to be replaced and when replaced, this information can be lost.

One non-limiting example of a VPD location 110, offered for illustrative purposes, is the I/O drawer depicted in FIG. 2, which will be discussed in greater detail later. This VPD location 210 depicts the distribution of VPD over a number of different elements at the VPD location 210.

When changes are made to software or hardware components of elements of a network or computer system, a manual repair and verify procedure may be utilized in order to preserve (or replace, if needed), the VPD associated with certain components. This manual procedure is inefficient both because it is manual and because it can introduce errors into the VPD. For example, this procedure may require a technician to manually set the system enclosure type, model, feature code, serial number, and other identifying properties. The enclosure serial number may be a multi-digit number printed on a bar-coded label on the system unit. When the system backplane is replaced, the multi-digit enclosure serial number and other identification are manually inputted and stored in the new system backplane by using an interface, such as, for example the Advanced System Management Interface (ASMI). Using the ASMI, an authorized user may login and complete a number of verification steps to input the enclosure serial number and feature code. Eliminating this manual procedure increases the efficiency of the system.

Returning to FIG. 1, a processor 120 in the system, for example, a service processor and/or service element, which can be a redundant service processor, can store at least one copy of the VPD from VPD location 110. The processor 120 may be an existing resource that is more static in nature than the VPD location 110 and is accessible to the VPD location 110 through an existing network connection.

As depicted in FIG. 1, the processor 120, stores a copy of the VPD from the VPD location 110. In an embodiment of the present invention, the processor 120 can store the VPD of the VPD location 110 based on the initiation of a service action, also referred to as a repair in the present specification, and/or based on the initiation of an initial program load. Rather than utilize additional or specialized hardware or software, the processor 120 can download the VPD stored at the VPD location 110 through an existing network connection and/or utility, such as service support network 130.

By storing a copy of the VPD by a processor 120, prior to events that could impact the VPD, such as the initiation of a part replacement, program code, including but not limited to existing firmware, can download the VPD (e.g., via a service support network 130) and can also verify and/or check whether the VPD in the VPD location 110 matches the copy, during or after an event that could impact the VPD in the VPD location 110, including but not limited to, replacement of a part and/or after an initial program load is complete. The servicing of the system is simplified because VPD in the VPD location 110 can be replaced utilizing an accurate source of this data.

Figure 2:
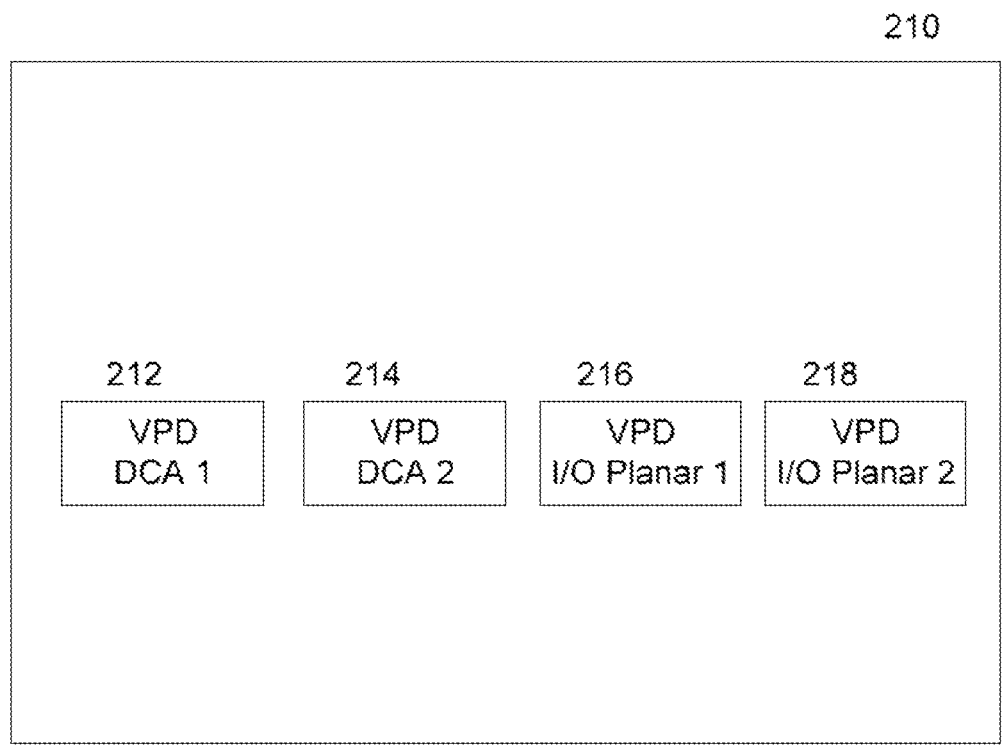
FIG. 2 illustrates various elements of an IO drawer that may be utilized in an embodiment of the present invention.

As aforementioned, FIG. 2 illustrates one example of a VPD location 210, in this case, an I/O drawer. As seen in FIG. 2, this example of a VPD location 210 is utilized to store VPD, which is segmented, in this example, across four components: DCA1 212, DCA2 214, IO Planar 1 216, and IO Planar 2 218. For example, in a system where the VPD is stored in two IO DCAs, per FIG. 2, DCA1 212 and DCA2 214, utilizing the present method, the IO DCAs can be replaced at the same time by a Support Service Representative (SSR), preventing extended service windows while the SSR provides the missing information manually. Without the advantages of the present invention, to replace multiple portions of the VPD in an IO drawer, for example, both IO DCAs, or one IO DCA and one IO planar, an SSR may repeatedly power off and on elements of the system to make the replacement. Because the present method enables a wholesale replacement of the VPD from the retained copy, the power off and on procedures are unnecessary, and the time and effort to enact these state changes is saved.

Returning to FIG. 1, in an embodiment of the present invention, both the processor 120 and the VPD location 110 send and receive VPD through an existing network connection, including but not limited to, a service support network 130. In an embodiment of the present invention, the processor 120 includes a memory to store the copy of the VPD obtained from the VPD location 110.

Figure 3:
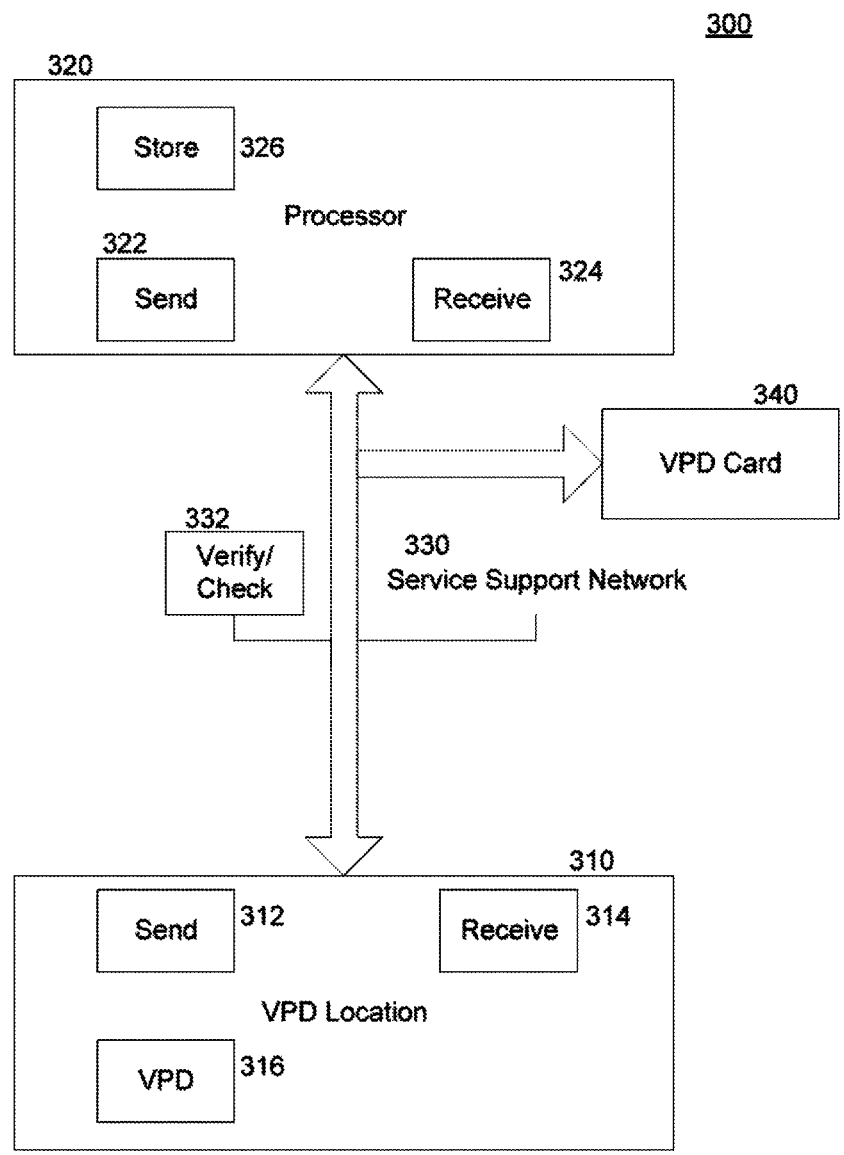
FIG. 3 depicts a technical environment that utilizes aspects of the present invention.

FIG. 3 depicts a technical environment that utilizes aspects of the present technique. The system 300 of FIG. 3 includes a VPD card 340 to store VPD information, including but not limited to the VPD of the whole machine. In an embodiment of the present invention, program code executing on a resource of the system 300 updates the VPD card such that the VPD card has the latest VPD information. The extra copy of the VPD on the VPD card is useful because in some systems, the service processor utilized to store a copy of the VPD, for example, for processor 320 may be redundant and can be replaced. If the processor 320 is replaced, the VPD card 340 provides a recent and complete copy of the VPD in case the VPD location 310 is serviced and the service processor's copy of the VPD in unavailable. When the VPD location 310 is serviced, program code can verify the VPD using the VPD card 340.

As in FIG. 1, in FIG. 3, program code copies the VPD from VPD location 310 to a processor 320, which may be a service processor. In this example, the VPD is stored at VPD location 310 is VPD storage 316. In order to exchange VPD between the processor 320 and the VPD location 310 through an existing connection between the two, in this non-limiting example, the service support network 330, the processor 320 and the VPD location 310 both execute program code to send and receive VPD from and to each other. The program code enabling this functionality is represented by modules in FIG. 3 in order to simplify the visual and as understood by one of skill in the art. The modular representation does not limit the structure or location of the program code providing this functionality. As illustrated in FIG. 3, the processor 320 has send 322 and receive 324 modules and the VPD location 310 includes send 312 and receive 314 modules, in addition to the VPD storage 316 module. The processor 320 also includes program code to store 326 the VPD it obtains from the VPD location 310. The processor 320 may store the VPD locally and/or to an external existing memory resource in the environment. In an embodiment of the present invention, the processor 320 includes a store module 326 for storing the VPD at a location internal to the processor 320.

As seen in FIG. 3, the service support network 330 handles communication between the VPD location 310 and the processor 320. The service support network 330 verifies and checks the VPD exchanged between the VPD location 310 and the processor 320 and updates the VPD card 340 to reflect any changes, such that the VPD card 340 reflects the most current and complete record of the VPD. For ease of understanding, the functionality of the service support network is pictured as a verify/check 332 module. The service support network can also query the VPD card 340 in order to verify that the information is complete and correct.

Figure 4:
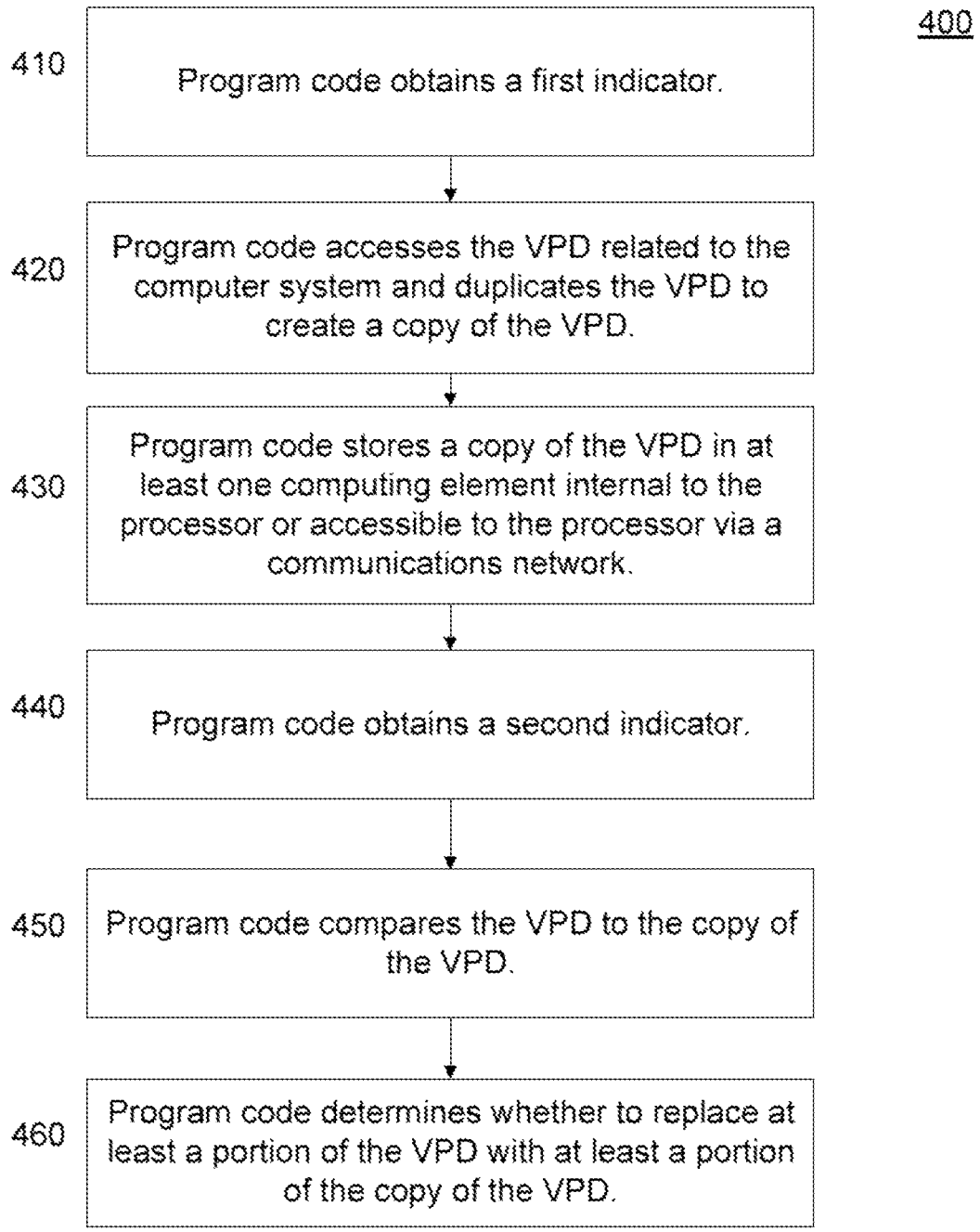
FIG. 4 is a workflow diagram depicting aspects of the present technique.
Figure 5:
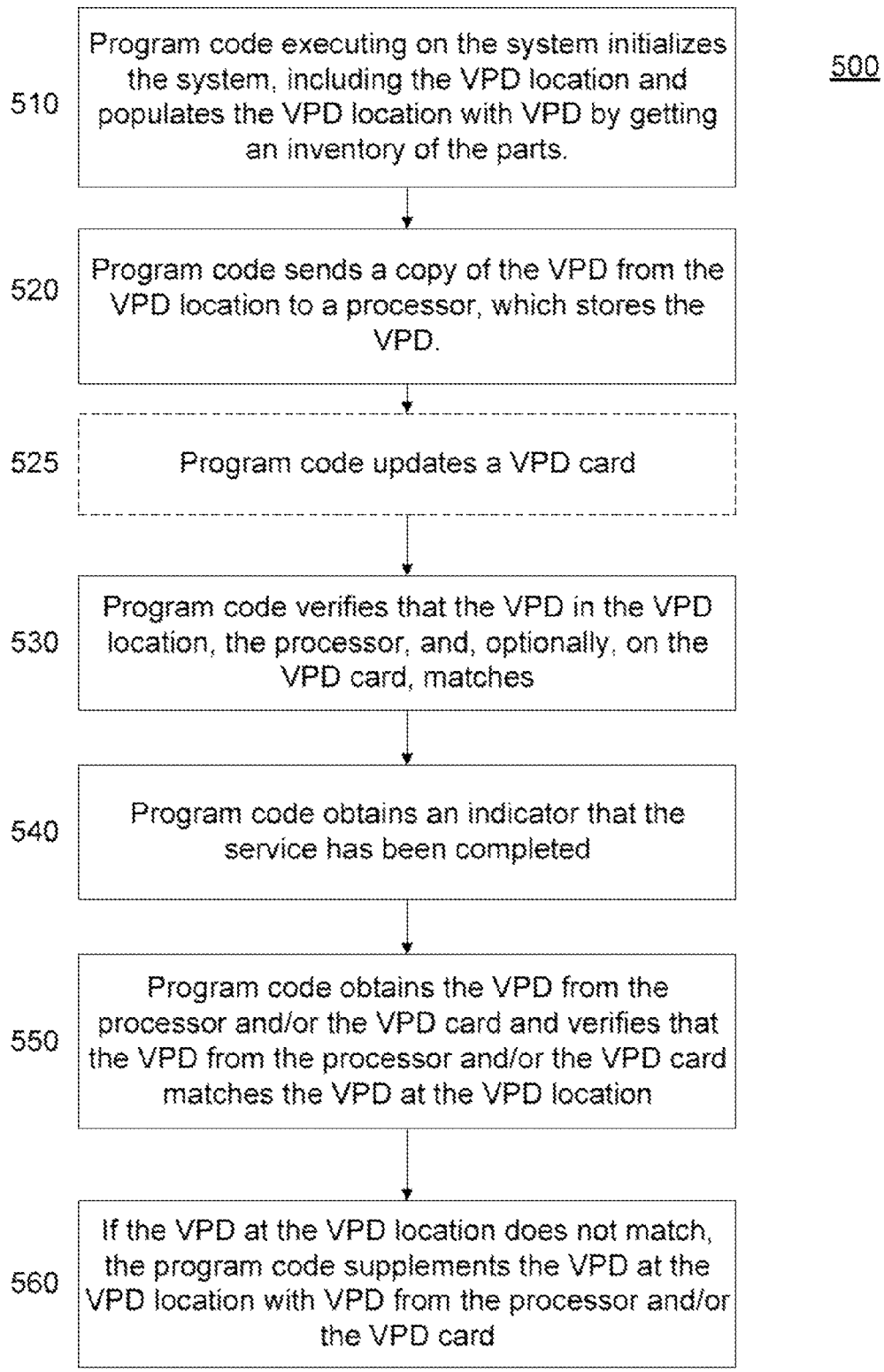
FIG. 5 is a workflow diagram depicting aspects of the present technique.

FIGS. 4 and 5 depict workflows that include aspects of certain embodiments of the present invention.

Referring first to the workflow 400 of FIG. 4, program code executed by a processor obtains a first indicator 410. This indicator may indicate that a repair has commenced in a computer system or that an initial program load has commenced in the computer system. Based on obtaining the first indicator, the program code accesses the VPD related to the computer system and duplicates the VPD to create a copy of the VPD 420. The program code stores a copy of the VPD in at least one computing element internal to the processor or accessible to the processor via a communications network 430. The program code obtains a second indicator 440. The second indicator may indicates one of: that the initial program load is complete or that the repair process is complete. Based on obtaining the second indicator, the program code compares the VPD to the copy of the VPD 450. The program code determines whether to replace at least a portion of the VPD with at least a portion of the copy of the VPD 460.

Now turning to the workflow 500 of FIG. 5, when a system is first powered on, program code executing on the system initializes the system, including the VPD location, which can be an IO drawer, and populates the VPD location with VPD by getting an inventory of the parts 510. Utilizing an existing network connection, including but not limited to, a service support network, the program code sends a copy of the VPD from the VPD location to a processor, such as a service processor or other service element, which stores the VPD 520. Depending upon the complexity and configuration of the system, the program code may also update a VPD card, communicatively connected to the existing network connection, with the VPD from the VPD location 525. The program code verifies that the VPD in the VPD location, the processor, and, optionally, on the VPD card, matches 530.

When a service action is initiated on the VPD location, the program code obtains an indicator that the service has been completed 540 and based on this obtaining the indicator, the program code obtains the VPD from the processor and/or the VPD card and verifies that the VPD from the processor and/or the VPD card matches the VPD at the VPD location 550. If the VPD at the VPD location does not match, the program code supplements the (defective) VPD at the VPD location with VPD from the processor and/or the VPD card 560.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 6, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 7:
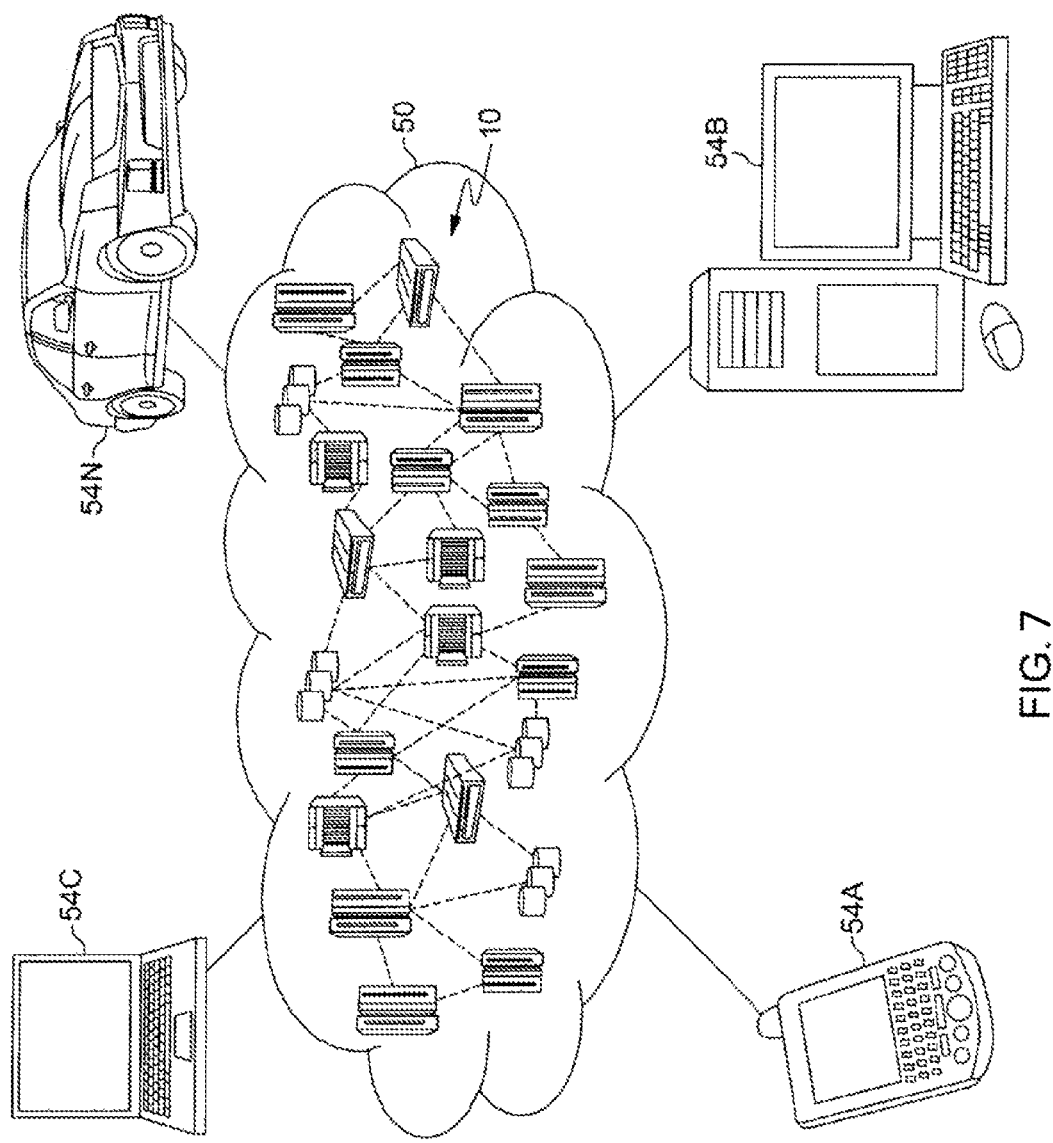
FIG. 7 depicts one embodiment of a cloud computing environment.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
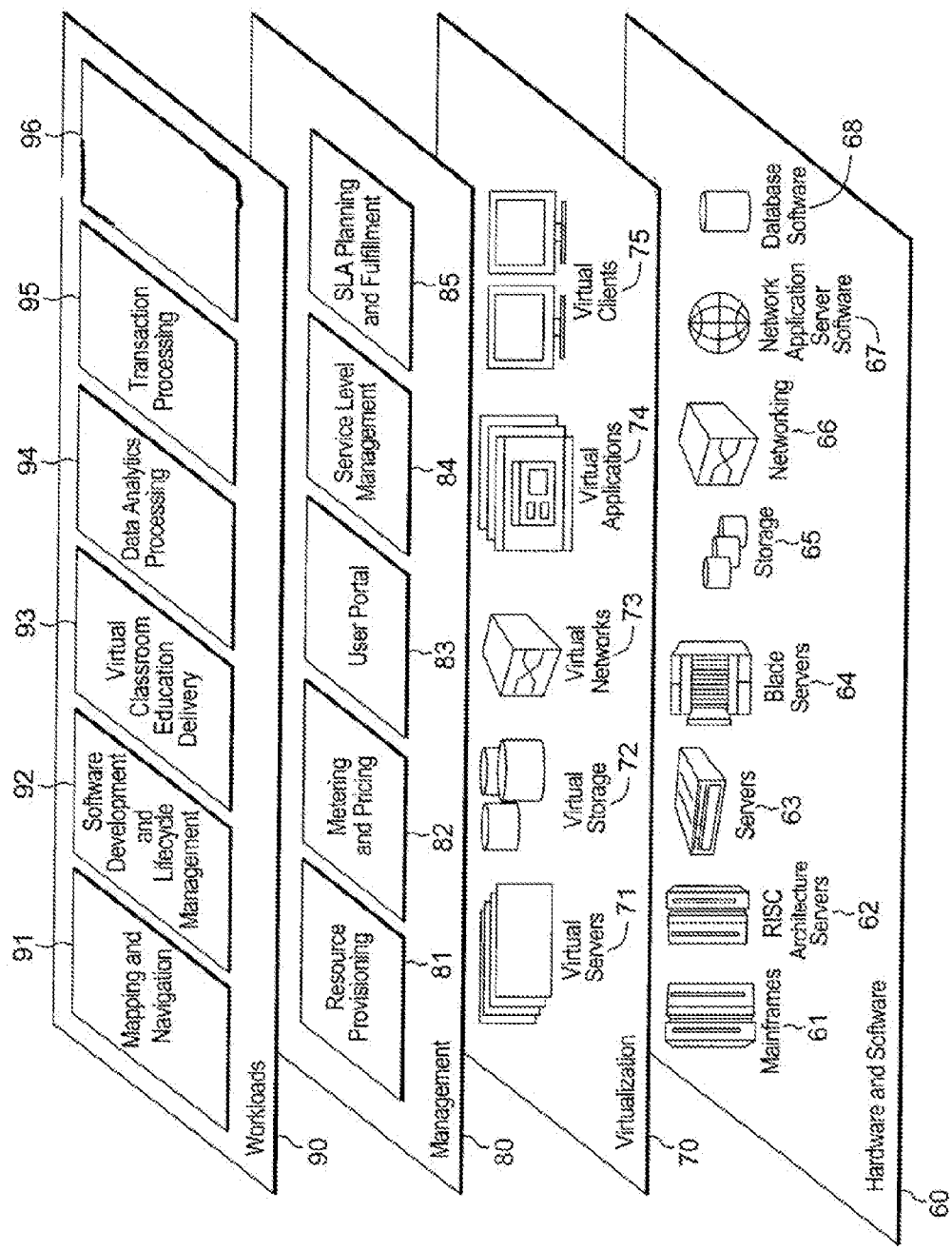
FIG. 8 depicts one example of abstraction model layers.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below, which may include maintaining VPD at a VPD location the computer system. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and notifying a user of a service related to the VPD.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method for maintaining virtual product data (VPD) in a computer system, comprising:
   obtaining, by a processor, a first indicator, wherein the first indicator indicates one of: a repair has commenced in a computer system or an initial program load has commenced in the computer system;
   based on the obtaining of the first indicator, accessing, by a processor, VPD related to the computer system and duplicating the VPD to create a copy of the VPD;
   storing, by the processor, the copy of the VPD in at least one computing element internal to the processor or accessible to the processor via a communications network;
   obtaining, by the processor, a second indicator, wherein the second indicator indicates one of: that the initial program load is complete or that the repair process is complete;
   based on the obtaining of the second indicator, comparing, by the processor, the VPD to the copy of the VPD;
   determining, by the processor, whether to replace at least a portion of the VPD with at least a portion of the copy of the VPD;
   based on the determining, replacing, by the processor, the at least a portion of the VPD with the at least a portion of the copy of the VPD, generating a revised VPD; and
   shielding, based on determining a nature of hardware comprising the computer system from the revised VPD by firmware communicatively coupled to the processor, operation of the firmware from a change to the computer system.

2. The method of claim 1, wherein the first indicator indicates that a repair has commenced and the repair comprises a replacement of at least one part related to an expansion unit of a computer resource in the computer system, and wherein the expansion unit stores the VPD.

3. The computer-implemented method of claim 1, wherein the processor comprises a service processor communicatively coupled to an element of the computer system storing the VPD.

4. The computer-implemented method of claim 2, wherein the expansion unit comprises an Input/Output (I/O) drawer.

5. The computer-implemented method of claim 1, the accessing further comprising:
   obtaining, by the processor, an inventory of parts and populating the VPD based on the inventory.

6. The computer-implemented method of claim 1, further comprising:
   accessing, by a processor, VPD related to the computer system and duplicating the VPD to create a second copy of the VPD; and
   storing, by the processor, the second copy of the VPD on a VPD card, wherein the VPD card is communicatively couple to the processor.

7. The computer-implemented method of claim 6, further comprising:
   based on the replacing, comparing, by the processor, the VPD with the second copy of the VPD; and
   updating, by the processor, the second copy of the VPD to be consistent with the VPD.

8. The computer-implemented method of claim 1, wherein the processor is redundant.

9. The computer-implemented method of claim 1, where in the processor is one of a flexible service processor or a bulk power controller.

10. A computer program product comprising:
    a computer readable storage medium readable by one or more processor and storing instructions for execution by the one or more processor for performing a method comprising:
       obtaining, by a processor, a first indicator, wherein the first indicator indicates one of: a repair has commenced in a computer system or an initial program load has commenced in the computer system;
       based on the obtaining of the first indicator, accessing, by a processor, VPD related to the computer system and duplicating the VPD to create a copy of the VPD;
       storing, by the processor, the copy of the VPD in at least one computing element internal to the processor or accessible to the processor via a communications network;
       obtaining, by the processor, a second indicator, wherein the second indicator indicates one of: that the initial program load is complete or that the repair process is complete;

based on the obtaining of the second indicator, comparing, by the processor, the VPD to the copy of the VPD;

determining, by the processor, whether to replace at least a portion of the VPD with at least a portion of the copy of the VPD;

based on the determining, replacing, by the processor, the at least a portion of the VPD with the at least a portion of the copy of the VPD, generating a revised VPD; and shielding, based on determining a nature of hardware comprising the computer system from the revised VPD by firmware communicatively coupled to the processor, operation of the firmware from a change to the computer system.

11. The computer program product of claim 10, wherein the first indicator indicates that a repair has commenced and the repair comprises a replacement of at least one part related to an expansion unit of a computer resource in the computer system, and wherein the expansion unit stores the VPD.

12. The computer program product of claim 10, wherein the processor comprises a service processor communicatively coupled to an element of the computer system storing the VPD.

13. The computer program product of claim 11, wherein the expansion unit comprises an Input/Output (I/O) drawer.

14. The computer program product of claim 10, the accessing further comprising:

obtaining, by the processor, an inventory of parts and populating the VPD based on the inventory.

15. The computer program product of claim 10, the method further comprising:

accessing, by a processor, VPD related to the computer system and duplicating the VPD to create a second copy of the VPD; and storing, by the processor, the second copy of the VPD on a VPD card, wherein the VPD card is communicatively couple to the processor.

16. The computer program product of claim 15, the method further comprising:

based on the replacing, comparing, by the processor, the VPD with the second copy of the VPD; and updating, by the processor, the second copy of the VPD to be consistent with the VPD.

17. A system comprising:

a memory;

one or more processor in communication with the memory; and program instructions executable by the one or more processor via the memory to perform a method, the method comprising:

obtaining, by a processor, a first indicator, wherein the first indicator indicates one of: a repair has commenced in a computer system or an initial program load has commenced in the computer system;

based on the obtaining of the first indicator, accessing, by a processor, VPD related to the computer system and duplicating the VPD to create a copy of the VPD;

storing, by the processor, the copy of the VPD in at least one computing element internal to the processor or accessible to the processor via a communications network;

obtaining, by the processor, a second indicator, wherein the second indicator indicates one of: that the initial program load is complete or that the repair process is complete;

based on the obtaining of the second indicator, comparing, by the processor, the VPD to the copy of the VPD;

determining, by the processor, whether to replace at least a portion of the VPD with at least a portion of the copy of the VPD;

based on the determining, replacing, by the processor, the at least a portion of the VPD with the at least a portion of the copy of the VPD, generating a revised VPD; and shielding, based on determining a nature of hardware comprising the computer system from the revised VPD by firmware communicatively coupled to the processor, operation of the firmware from a change to the computer system.

* * * * *